United States Patent [19]

Mauldin et al.

[11] 4,369,129
[45] Jan. 18, 1983

[54] PRODUCTION OF RHENIUM-CONTAINING REFORMING CATALYSTS

[75] Inventors: Charles H. Mauldin; William C. Baird, Jr., both of Baton Rouge, La.

[73] Assignee: Exxon Research and Engineering Co., Florham Park, N.J.

[21] Appl. No.: 253,080

[22] Filed: Apr. 10, 1981

Related U.S. Application Data

[63] Continuation-in-part of Ser. No. 161,878, Jun. 25, 1980, abandoned.

[51] Int. Cl.³ .............................................. B01J 27/02
[52] U.S. Cl. ..................................................... 252/439
[58] Field of Search ......................................... 252/439

[56] References Cited

U.S. PATENT DOCUMENTS

| | | | |
|---|---|---|---|
| 2,939,847 | 6/1960 | Smith et al. | 252/439 |
| 3,415,737 | 12/1968 | Kluhsdahl | 252/439 X |
| 3,449,078 | 6/1969 | Quilk et al. | 252/439 X |
| 3,660,271 | 5/1972 | Keith | 252/439 X |
| 3,843,560 | 10/1974 | Hayes | 252/439 |
| 4,178,268 | 12/1979 | Antos et al. | 252/439 |

Primary Examiner—Delbert E. Gantz
Assistant Examiner—William G. Wright
Attorney, Agent, or Firm—Llewellyn A. Proctor

[57] ABSTRACT

A rhenium-containing catalyst, particularly one comprising platinum and rhenium, composited with a porous inorganic support material, especially alumina, is found to be more selective in hydrocarbon conversion reactions, particularly reforming (hydroforming) when pretreated in a sequence which includes the steps of oxidation, dry hydrogen reduction, and sulfiding. In all embodiments, the hydrogen reduction step is conducted at conditions sufficient to remove product water from the catalyst as it is produced until the catalyst becomes dry, or desiccated, and to continue such treatment until the amount of water contained in the exit gas is less than about 1000 ppm, preferably less than about 500 ppm. In a preferred embodiment, the catalyst is desiccated by an initial high temperature oxidation treat to activate the porous inorganic oxide base, or alumina, and then the hydrogen reduction step is performed at a lower temperature than that employed to effect the oxidation.

15 Claims, 1 Drawing Figure

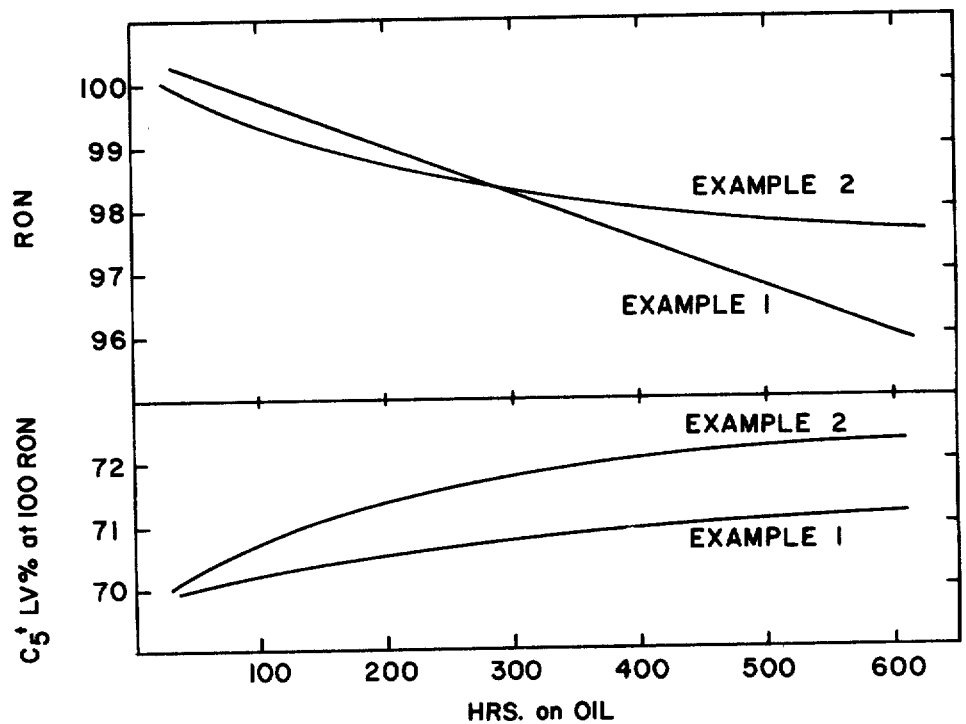
REFORMING PARAFFINIC NAPHTHA WITH PtRe
930°F, 200 psig, 5000 SCF/B, 1.4 W/H/W

PRODUCTION OF RHENIUM-CONTAINING REFORMING CATALYSTS

RELATED APPLICATIONS

This is a continuation-in-part of application Ser. No. 161,878 filed June 23, 1980, now abandoned.

BACKGROUND OF THE INVENTION AND PRIOR ART

Catalytic reforming, or hydroforming, is an established process in the petroleum refining industry and has been used for improving the octane quality of naphthas and straight run gasolines for many years. Catalysts used in catalytic reforming are recognized as dual- or poly-functional, the catalyst composite including a component comprising a metal, or metals, or a compound or compounds thereof, providing a hydrogenation-dehydrogenation (hydrogen transfer) function, isomerization function, hydrocracking function and/or hydrogenolysis function, and an acidic component providing isomerization, cracking, and/or hydrocracking functions.

The platinum group, or Group VIII noble metals (ruthenium, osmium, rhodium, iridium, palladium and platinum), despite their expense, have been long recognized as particularly efficient hydrogen transfer components. Platinum per se has, in fact, proven par excellent as a hydrogen transfer component and, in fact, possesses a combination of properties which makes it particularly suitable as a component for commercial reforming catalysts. Conventional reforming catalysts have thus long employed platinum composited with an inorganic oxide base, particularly alumina, to which halogen is added to supply the isomerization function. Platinum catalysts have achieved world-wide use in commercial reforming operations.

There is a desideratum in the art, occasioned in large part by the withdrawal of alkyl lead compounds based on ecological considerations, and intensive efforts are again underway to improve the octane quality of naphthas and gasolines while suppressing the use of such additives, or by elimination of such additives, and present emphasis is on the improvement of reforming catalysts. Improvements have been made, and new species of catalyts have been developed. The new family of reforming catalysts which have proven most satisfactory are largely bimetallic, or multimetallic, and most (if not all) include platinum as an essential component. Thus, platinum yet maintains a rank of distinction as a component of commercially viable reforming catalysts. The industry, in turning to catalysts which employ multimetallic components to provide effective hydrogen transfer and dehydrocyclization for improving the octane quality of naphthas and gasolines in commercial operations, has also utilized catalysts which contain both platinum and rhenium (e.g., U.S. Pat. No. 3,415,737). While the combination of platinum and rhenium has proven effective, surpassing platinum per se as a hydrogen transfer and dehydrocyclization component for commercial reforming operations, further improvements in the performance of such catalysts are quite desirable.

Platinum-rhenium catalysts possess satisfactory activity for use in reforming operations, activity being defined as that property which imparts the ability to produce aromatics, aromatic production (or octane improvement) generally being measured as a function of temperature, feed rate, etc. Platinum-rhenium catalysts also possess satisfactory selectivity which is defined as that property which imparts the ability of the catalyst to produce high yields of high octane number $C_5^+$ liquid products with concurrent low production of normally gaseous hydrocarbons, i.e., $C_1$–$C_4$ hydrocarbons, or solid carbonaceous by-products and coke, which form on the catalysts during reforming. These catalysts also possess good stability or activity maintenance, i.e., activity plotted as a function of time, good stability or activity maintenance being defined as high retention of activity and selectivity, or continued high activity and stability for prolonged periods during hydrocarbon conversion, or reforming operations.

While any commercially viable reforming catalyst must possess all of these properties to a significant degree, no catalyst used in real world operations can possess all of these properties to the ultimate degree. One of these characteristics may be possessed by a catalyst in admirable degree, but the proper quality of another of these characteristics may adversely affect the worth of the catalyst. Thus, a catalyst which possesses good selectivity does not necessarily have good activity, and vice versa. A small decrease in $C_5^+$ liquid yield can thus represent a large debit in commercial reforming operations. Conversely, the worth of a catalyst which possesses high selectivity may be jeopardized by the considerable capitol cost which necessitates large charges of noble metals containing catalysts. Proper balance between these several properties is essential in the commercial world and an improvement gained in one property, or characteristic, cannot be too much offset by loss of another if the catalyst is to prove commercially viable.

Platinum-rhenium catalysts possess a generally satisfactory balance between these several desirable properties for use in reforming, particularly as regards their selectivity, or ability to produce high $C_5^+$ liquid yields from naphthas and straight run gasolines. Nonetheless, quite obviously, further improved $C_5^+$ liquid yields are highly desired in the world's present short fuel supply situation. Hence, a goal of research and development is to further improve the performance of the basic platinum-rhenium catalyst, especially as relates to its selectivity.

Accordingly, it has now been discovered that a catalyst comprising catalytically active amounts of rhenium, especially platinum and rhenium, composited with a porous inorganic base, notably alumina, is more selective, and more stable for producing high octane products from gasolines and naphtha at reforming conditions if it is pretreated in a sequence which includes the steps of oxidation, dry hydrogen reduction, and sulfiding. The dry hydrogen reduction step is critical. In all embodiments, the hydrogen reduction step is conducted at conditions sufficient to remove product water from the catalyst as it is produced, and the reduction is continued until the stream of hydrogen gas leaving said catalyst (i.e., the exit gas) contains less than about 1000 parts per million of moisture (water) by volume, preferably less than about 500 ppm water. Whereas processes are known wherein oxidized rhenium-containing catalysts have been contacted with dry hydrogen, no one heretofore insofar as is known has recognized the necessity of continuing the reduction sufficient to remove all water, even the in situ water formed by the reduction of the metal oxides of the catalyst. In practicing the invention, the duration of contact of the catalyst with dry hydrogen is continued until the catalyst becomes dry, or desiccated; this state being reached when the hydrogen leaving said catalyst contains less than 1000 ppm water, preferably less than 500 ppm water. This means, of course, that the dry hydrogen used for the reduction must contain less than 1000 ppm moisture, or 500 ppm moisture, respectively; and preferably the hydrogen should be considerably drier, and should contain no more than 100 ppm water, preferably less than 50 ppm water.

The contact time and moisture level are to some extent interrelated, and several hours may be required to desiccate the catalyst adequately to properly reduce the catalyst. Thus, the period required to properly reduce the catalyst may range above about 2 hours, often above about 8 hours. However, it is feasible to achieve the desired reduction within a quite rapid period by the use of an initial high temperature oxidation treat to activate the porous inorganic oxide base, or alumina, such that its surface is thereafter substantially dry, and desiccated, and then to perform the hydrogen reduction step at a lower temperature than that employed to effect the oxidation. Thus, if the oxidation step is conducted at relatively high temperature, and the hydrogen reduction step is conducted at a temperature below that at which the oxidation step was conducted, the reduction time can be shortened considerably and highly active catalysts of consistently high selectivity and stability can be prepared as contrasted with similar catalysts conventionally prepared.

It is believed that the chief benefit imparted by the rhenium to the catalyst is that of greater coke tolerance. The mechanism which makes the catalyst more tolerant of the deactivating coke is not known with any degree of certainty, but it is believed that the formation of intermetallic catalytic alloys, or clusters, is a principal factor, and that the formation of these species is dependent on the existance thereof of rhenium and another metal, or metals, in a zero valent state. Consequently, it is believed that the process of this invention is one which provides greater effectiveness in the occurrence of a solid state reaction between rhenium and another metal, or metals, component.

In accordance therewith the pretreatment of the rhenium-containing catalysts includes three discrete steps, to wit: (1) the catalyst is contacted at an elevated temperature of at least about 850° F. with an oxygen-containing gas, preferably air with or without added oxygen, the metal substitutent, or substitutents, constituting the hydrogenation-dehydrogenation component thereof being oxidized sufficient to form rhenium oxide, or rhenium oxide with other metal oxides, dispersed over the catalyst surface, and the oxidized catalyst is then (2) reduced with dry hydrogen, or a dry gas containing sufficient hydrogen to reduce the rhenium oxide, or rhenium oxide and other metal oxides, substantially to the zero valent state necessary for optimum intermetallic interaction. The temperature of the oxidation step (1), supra, should be greater than about 850° F., and should be at least equal to or preferably greater than the temperature of the hydrogen reduction step. The hydrogen reduction step must be of sufficient duration to produce an exit gas containing less than about 1000 ppm water, preferably less than about 500 ppm water. If the temperature of the reduction and oxidation steps are about equal, then a relatively long reduction time is required to obtain optimum stability and selectivity advantages. If the temperature of the oxidation step is greater than the temperature of the reduction step, then the time required for the reduction can be greatly lessened. After the oxidation and reduction steps are completed (3) the catalyst is contacted with a sulfur-containing fluid, gas or liquid, to convert the reduced metal surface substitutents of the catalyst to the sulfide form.

In the oxidation step (1), supra, the catalyst is suitably contacted with a flowing gas stream of an oxygen-containing gas, preferably air, suitably at temperatures ranging from about 850° F. to about 1100° F., preferably at temperatures ranging from about 950° F. to about 1050° F. Suitably, the period of treatment ranges from about 2 hours to about 10 hours, preferably from about 3 hours to about 4 hours. In the reduction step (2), supra, the oxidized metal surface of the catalyst is suitably contacted with a flowing stream of dry hydrogen, or a dry hydrogen-containing gas, at a temperature below that at which the oxidation step was carried out, suitably at a temperature ranging from about 100 to about 250 Farenheit degrees, preferably from about 100 to about 150 Farenheit degress, below that at which the oxidation step was conducted. Expressed in absolute terms, the reduction is generally conducted at temperatures ranging from about 700° F. to about 950° F., preferably from about 800° F. to about 950° F. The time of reduction suitably ranges from about 0.5 hours to about 10 hours, though from about 0.5 hours to about 2 hours is generally sufficient for complete reduction of the metal oxides of the catalyst when adequate differential temperatures are maintained between the oxidation and reduction steps. Absolute pressures generally range from about atmospheric to about 400 pounds per square inch (psi), pressures ranging below about 100 psi being preferred.

The substantially complete reduction of the catalytic metal oxides to the zero valent state is essential. Again, whereas Applicants do not wish to be bound by a theory of mechanism, it is believed that the completeness of the reduction is controlled by the chemical equilibrium represented by the equation

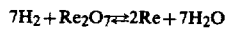

$$7H_2 + Re_2O_7 \rightleftharpoons 2Re + 7H_2O$$

According to the principle of Le Chatlier the reduction may be driven to completion by providing a significantly higher partial pressure of the reactant hydrogen to that of the product water, by removing the product water from the reacting system as it is produced, or by a combination of both these factors. In essence it is desirable to maintain as dry a reducing environment as practical to favor the formation of rhenium metal. This dehydrated condition may be created in two ways. In the metal. This dehydrated condition may be created in two ways. In the case of long reduced catalysts this relationship is established by the continuous removal of water from the reaction with extended hydrogen flow. Alternatively, this relationship is established by the absorption of a critical amount of the product water by the alumina support. In this instance it is necessary that the alumina first become activated by a high temperature air treat, and second that the reduction be performed at a lower temperature than the air activation temperature so that the equilibrium for the desiccant action of the alumina is favored. Both of these procedures effectively remove water from the reaction, elevate the hydrogen to water partial pressure relationship, and drive the reduction to completion. In this way the level of dehydration of the two reductions becomes equal, the same degree of reduction occurs, and equivalent catalyst performance results. The effect of proper catalyst reduction, in any regard, is to decrease hydrocracking reactions and thereby increase liquid yields. Since hydrocracking sites are responsible for coking reactions as well, decreasing these sites favors catalytic stability.

The degree of catalyst reduction is important to ultimate catalyst performance. The reducibility of rhenium oxide in rhenium containing catalysts has been a topic of some controversy. McNicol [J. Catalysis, 46, 438 (1977)] has shown that a platinum-rhenium (Pt-Re) (0.4/0.2 wt. %) catalyst is >80% reduced after 1 hour at 500° C. and 95% reduced after 1 hour at 550° C. Thus, it would seem that a typical Pt/Re reforming catalyst reduced in this way should perform satisfactorily for naphtha reforming. However, it has been shown that such catalysts reduced in this way are in fact inferior, and lack consistency in their ability to reform hydrocarbons. The critical element in the reduction process is not the time period per se, and reduction temperature and pressure are of secondary importance. What is most important, it has been found, is that the reduction be carried out in the essential absence of water, inclusive of that released in situ by the conversion of the metal oxides. The presence of water, it is believed, may stabilize rhenium in a high oxidation state and inhibit its reduction to the required low valence state.

A properly reduced rhenium catalyst will require optimum sulfiding conditions to yield a superior reforming catalyst. The reduced catalyst is sulfided by contact with a sulfide, generally hydrogen sulfide or compound which will produce hydrogen sulfide in situ. Suitably, the catalyst can be sulfided by contacting it with a sulfur-containing gas, especially hydrogen sulfide containing hydrogen or gas containing hydrogen and other gases in admixture with hydrogen sulfide or a hydrogen sulfide precursor in dilute concentration, i.e., from about 50 parts to about 5000 parts per million parts by volume, preferably from about 1000 to about 3000 ppm of hydrogen sulfide. The catalyst can also be sulfided by breakthrough sulfiding with hydrogen sulifde. Breakthrough sulfiding is generally conducted by sulfiding with hydrogen sulfide at a pressure equal to or less than the reduction pressure and at a temperature equal to or less than the reduction temperature to provide superior performance. Suitably also, the reduced catalyst can be presulfided by contact with a sulfur-containing naphtha feed. However, the reduction remains the critical feature independent of the sulfiding procedure employed.

The principal benefit of rhenium-containing catalysts properly oxidized, prereduced, and sulfided is increased liquid yield in naphtha reforming. It is found that $C_5^+$ liquid yield advantages of 4–5 LV% ca be provided by proper prereduction and sulfiding of these catalysts, subsequent to their oxidation. The yield advantage is provided by the suppression of metal promoted hydrogenolysis reactions which lead to the formation of $C_1$-$C_4$ hydrocarbons, especially the $C_2$-$C_4$ hydrocarbons. While hydrogenolysis of the methane producing type can generally be effectively controlled by conventional sulfiding, the type of hydrogenolysis which leads to the formation of $C_2$-$C_4$ hydrocarbons is suppressed by proper oxidation, prereduction and sulfiding. In addition, catalyst pretreatment in accordance with this invention affords greater aromatization activity.

This method of pretreatment is applicable to virtually any rhenium containing catalyst. A catalyst composition particularly suitable for pretreatment in accordance with this invention is one which comprises from about 0.05 to about 3 percent platinum, preferably from about 0.1 to about 1 percent platinum, and from about 0.05 to about 3 percent rhenium, generally from about 0.1 to about 1 percent rhenium, based on the total weight (dry basis) of the composition. Preferably, the rhenium contained in such catalyst compositions ranges from about 0.1 to about 1 percent, more preferably from about 0.15 to about 0.70 percent, based on the weight (dry basis) of the total catalyst compositions.

The preferred catalyst of this invention not only includes platinum and rhenium, but platinum, rhenium and a promoter metal, suitably palladium or copper or both. The preferred catalyst also contains halogen. The catalyst compositions initially contain from about 0.1 to about 5 percent halogen, preferably from about 0.5 to about 2.5 percent halogen. The catalysts, as a result of the presulfiding also contain sulfur suitably from about 0.001 to about 2 percent, preferably from about 0.001 to about 0.15 percent sulfur, based on the total weight (dry basis) of the catalyst compositions.

The metals hydrogenation-dehydrogenation components are composited with a support material, suitably mildly or moderately acidic refractory inorganic oxides, e.g., silica, silica-alumina, magnesia, thoria, boria, titania, zirconia, various spinels and the like, including, in particular, alumina, and more particularly gamma alumina, which species are preferred. High surface area catalysts, or catalysts having surface areas ranging upwardly from about 10, and preferably 100 m$^2$/g. (B.E.T.) are preferred. In particular, catalysts having surface areas ranging from about 150 to about 600 m$^2$/g. prove quite satisfactory.

The platinum and rhenium, or platinum, rhenium and other components can be composited or intimately associated with the porous inorganic oxide support by various techniques known to the art such as ion-exchange, coprecipitation, or physical mixing of fine particles with the alumina in the sol or gel form, etc. For example, the catalyst composite can be formed by adding together suitable reagents such as water soluble salts of platinum and rhenium, and ammonium hydroxide or ammonium carbonate, and a salt of aluminum such as aluminum nitrate, aluminum sec-butoxide, or aluminum sulfate to form aluminum hydroxide. When the metals are included in the preparation of the support, higher concentrations of the metals are often necessary. The aluminum hydroxide containing the salts of platinum and rhenium can then be heated, dried, formed into pellets or extruded, and then calcined in nitrogen or nonagglomerating atmosphere. The platinum can be added to the support, and then the rhenium added. Or the rhenium can be added, and then the platinum added. Suitably, platinum, rhenium, and halogen are added simultaneously and the catalyst then dried. On the other hand, if the platinum, and rhenium have already been added as by co-precipitation from an alumina gel, the halide can be subsequently added, e.g., by impregnation from an aqueous HCl solution, or by gas phase chlorination with an HCl-Cl$_2$ mixture or other halide precursor.

Essentially any hydrocarbon fraction containing paraffins, naphthenes, and the like, admixed one with the other or in admixture with other hydrocarbons, can be converted by means of the catalyst of this invention. A suitable feed can be a virgin naphtha, cracked naphtha, a Fischer-Tropsch naphtha or the like, or mixtures thereof. The feed is contacted at reforming conditions in the presence of hydrogen (once-through, or recycle) with a catalyst composite including a support which contains catalytically active amounts of the metals. Typical feed stream hydrocarbon molecules are those containing from about 5 to about 12 carbon atoms, or more preferably from about 6 to about 12 carbon atoms, or more preferably from about 7 to about 10 carbon atoms. Naphthas, or petroleum fractions, boiling within the range of from about 80° F. to about 450° F., and preferably from about 125° F. to about 375° F., contain hydrocarbons or carbon numbers within these ranges. Typical fractions thus usually contain from about 20 to about 80 volume percent of paraffins, both normal and branched, which fall in the range of about $C_5$ to $C_{12}$, and from about 20 to about 80 volume percent of naphthenes boiling within the range of about $C_6$ to $C_{12}$. Typical feeds generally contain from about 5 through about 20 volume percent of aromatics which boil within the range of about $C_6$ to $C_{12}$, typically as produced in the product from the naphthenes and paraffins.

The invention will be more fully understood by reference to the following demonstrations, selected nonlimiting examples, and comparative data which illustrate its more salient features. All parts are given in terms of weight except as otherwise specified.

The demonstrations represented by Runs 1-6 below show that long reduction times with dry hydrogen provides superior catalysts as contrasted with catalysts otherwise similarly prepared except that the reduction periods are of short duration. In these runs the moisture level of the exit hydrogen gas was not measured, and at the time the critical nature of the moisture contained in the exit gas was not recognized.

DEMONSTRATIONS

A catalyst was prepared for demonstrative purposes from portions of commercially supplied high purity gamma alumina extrudates impregnated with a solution of salts of platinum and rhenium (Pt/Re; nominally, 0.3 wt. % Pt/0.3 wt. % Re), treated and activated and portions thereof then employed in a series of representative reforming runs.

In conducting the runs, charges of the catalyst (25-30 g.) were placed in a quartz reactor and pretreated with gases at flow rates fixed at 600 cc/min (corresponding to 24 cc $min^{-1}g^{-1}$). The charges of catalyst were air activated for 3 hours in flowing air at 932° F. The air was purged with nitrogen, and some charges of the catalyst were reduced with flowing dry hydrogen (20 ppm $H_2O$) at temperature, pressure, and time as subsequently specified. Other charges were not reduced. At the conclusion of the reduction when the charge of catalyst was reduced, or after the air oxidation where the charge of catalyst was not reduced, the gas stream was switched to a stream of 0.2% (by volume) hydrogen sulfide in hydrogen. Breakthrough sulfiding occurred in 7-10 min. depending upon the temperature and pressure selected. The sulfided catalyst was stripped of excess hydrogen sulfide in flowing hydrogen at the temperature of sulfiding for 1-2 hours. The catalyst was then cooled under flowing nitrogen and stored under a nitrogen blanket for use in conducting on-oil reforming runs. The catalyst was then evaluated in a continuously operated reactor for reforming heptane at essentially the same conditions of temperature, pressure, hydrogen rate and space velocity, as identified in Table I.

TABLE I
THE EFFECT OF EXTENSIVE REDUCTIONS ON PLATINUM-RHENIUM CATALYSTS
Heptane Reforming: 100 Psig, 932° F.,
10 W/H/W, $H_2$/Heptane = 5

| Run No. | 1 | 2 | 3 | 4 | 5 | 6 |
|---|---|---|---|---|---|---|
| Reduction |  |  |  |  |  |  |
| Temperature, °F. | (None) | 700 | 932 | 900 | 932 | 700 |
| Time, Hours |  | 1 | 1 | 1 | 7 | 8 |
| Pressure, psig |  | Atm. | Atm. | 100 | Atm. | 100 |
| Sulfiding |  |  |  |  |  |  |
| Temperature, °F. | 700 | 700 | 932 | 900 | 700 | 700 |
| Catalyst |  |  |  |  |  |  |
| Cl, Wt. % | 0.91 | 0.90 | 0.93 | 1.03 | 0.99 | 1.06 |
| S, Wt. % | 0.13 | 0.09 | 0.08 | 0.08 | 0.17 | 0.11 |
| Conversion, Wt. % | 89.8 | 88.3 | 89.3 | 89.1 | 86.6 | 85.9 |
| Yields (Wt. %) |  |  |  |  |  |  |
| $C_1$ | 1.8 | 1.7 | 1.8 | 1.4 | 1.3 | 1.3 |
| $C_2$ | 4.7 | 4.4 | 4.3 | 4.1 | 3.7 | 3.8 |
| $C_3$ | 9.5 | 9.3 | 8.4 | 8.3 | 7.4 | 8.0 |
| i-$C_4$ | 4.5 | 4.2 | 3.9 | 4.9 | 3.9 | 4.5 |
| n-$C_4$ | 8.2 | 8.2 | 7.3 | 6.6 | 6.2 | 6.4 |
| $C_4^-$ | 28.7 | 27.8 | 25.7 | 25.3 | 22.5 | 24.0 |
| $C_5^+$ | 71.3 | 72.2 | 74.3 | 74.7 | 77.5 | 76.0 |
| Toluene | 29.7 | 28.9 | 31.6 | 31.6 | 32.9 | 28.2 |

The data given in Table I illustrate the reforming of heptane over various Pt/Re catalysts at the conditions shown. Note that in all cases conversion was constant at about 85-90%. The catalyst of Run 1, which utilized a catalyst that was not reduced but was sulfided, showed the poorest yield performance with $C_4^-$ formation amounting to 28.7 wt. %. In Runs 2-4, where the catalysts were reduced for 1 hour at 700° F. or 932° F. at atmospheric pressure, or at 900° F., 100 psig followed by sulfiding at the same conditions, improvement was minor with the $C_4^-$ formation declining in Runs 3 and 4 to about 25 wt. %. In Runs 5 and 6, where catalyst reduction was performed at 932° F., 1 atm. for 7 hours and 700° F., 100 psig for 8 hours, it will be observed that the formation of $C_4^-$ was further reduced amounting to 22.5 wt. % in Run 5 and 24 wt. % in Run 6. Prolonged reduction was found to provide a 22% decrease in light gas formation relative to the non-reduced catalyst (Run 1). Reductions carried out for 1 hour were found to provide only a 11% decrease relative to Run 1. These data illustrate the superior hydrogenolysis suppression of a platinum-rhenium catalyst reduced over a long period of time. The impact of prolonged reduction on hydrogenolysis is clearly evident in the decline of the two primary products of metal site hydrocracking, methane and n-butane. Iso-butane is the primary product of acid cracking and remains essentially unchanged over the range of catalyst chloride shown. Ethane and propane are of less diagnostic value being produced by both metal and acid cracking. However, these values also respond to reduction severity reflecting suppression of metal promoted hydrogenolysis at constant catalyst acidity.

The data further show the enhanced aromatization activity of a properly reduced, sulfided rhenium catalyst. Referring to Run 5, Table I, it will be observed that the formation of aromatics surpasses all other catalysts. These data clearly indicate that long reduction at high temperature followed by breakthrough sulfiding at a reduced temperature is a preferred method of catalyst pretreatment.

The following exemplify the beneficial effects of reducing catalysts over a period sufficient to desiccate the catalyst, as manifested by the water content of the exit gas.

EXAMPLES 1-4

A 0.3 wt. % Pt-0.3 wt. % Re catalyst was prepared as previously described. Samples of the catalyst were air activated, reduced with the same dry hydrogen gas, and sulfided using the general procedures also previously described. The catalysts were then evaluated in heptane reforming, and the results are presented in Table II.

TABLE II

THE EFFECT OF EXTENSIVE REDUCTION ON THE DEHYDRATION OF PLATINUM-RHENIUM CATALYSTS
Heptane Reforming: 100 Psig, 932° F., 10 W/H/W, $H_2$/Heptane = 5

| Example No. | 1 | 2 | 3 | 4 | |
|---|---|---|---|---|---|
| Air Activation | | | | | |
| Temperature, °F. | 932 | 932 | 932 | 932 | |
| Time, Hours | 3 | 3 | 4 | 3 | |
| $H_2O$ in air, ppm (end of treat) | 300 | 350 | 300 | 295 | |
| Reduction | | | | | $N_2$ Purge |
| Temperature, °F. | 932 | 932 | 932 | 932 | 932 |
| Time, Hours | 1 | 8 | 17 | 1 | 17 |
| $H_2O$ in $H_2$, ppm | >1000 | 300 | >1000 @ 3 hr. | >1000 | 110 |
| (end of treat) | | | 350 @ 17 hr. | | |
| Sulfiding | | | | | |
| Temperature, °F. | 932 | 932 | 932 | 932 | |
| Yield, Wt. % | | | | | |
| $C_1$ | 1.4 | 1.1 | 1.2 | 1.4 | |
| n-$C_4$ | 6.7 | 5.4 | 5.6 | 6.5 | |
| $C_5^+$ | 76.5 | 80.1 | 79.9 | 77.2 | |
| Toluene | 26.3 | 31.2 | 29.1 | 25.4 | |

As previously seen the single variation is the length of the reduction period. In Examples 1-4 the water content of the treat gases was measured with a Meeco water analyzer during the air activation step and during the reduction step. The equilibrium water level in the exit air stream was about 300 ppm. When the treat gas was switched from air to hydrogen, the water level of the exit gas increases due to the formation of water during the reduction. In Example 1 where reduction was carried out for 1 hr. at 932° F., the water level of the exit hydrogen was in excess of 1000 ppm. In Example 2 where reduction occurred for 8 hr. at 932° F. the exit gas water level had declined to the equilibrium value at the conclusion of the reduction. Similarly, in Example 3 the initially high water level of the exit gas (>1000 ppm after 3 hr.) declined to the base level after 17 hr. In Example 4 the catalyst was again reduced for 1 hr. at 932° F. at which time the water level of the exit gas exceeded 1000 ppm. The catalyst was then treated with dry nitrogen for a total of 16 hr. at which time the exit gas water level was measured as 110 ppm. All four catalysts were evaluated in heptane reforming as indicated in Table II. Examples 2 and 3 utilizing catalysts prepared according to the preferred procedure of this invention exhibit superior aromatization activity and yield and suppressed hydrogenolysis. The catalysts of Examples 1 and 4 were clearly inferior as a consequence of inadequate reduction due to the hydrated state of the catalyst at the conclusion of the reduction period. In this sense Example 4 is especially noteworthy. At the conclusion of the reduction the "wet" catalyst was extensively dried by purging with dry nitrogen. However, since no further reduction of the metals could occur during the passage of nitrogen, the metals behaved exactly like a 1 hr. reduced catalyst even though the total catalyst was extensively dehydrated. Examples 1-4 clearly illustrate that superior performance results from extensive reduction leading to reduced hydrogenolysis; and that extensive reduction results only when the by-product water is purged from the reducing catalyst in the presence of the reducing gas.

EXAMPLES 5-7

A 0.3 Pt-0.3 Re catalyst was pretreated and tested in heptane reforming as illustrated in Table III. Samples of the catalysts were air activated, reduced with the same dry hydrogen gas as previously described. All catalysts were breakthrough sulfided subsequent to reduction and at the reduction temperature. Example 5 is the reference catalyst reduced at 932° F. for 1 hr. Example 6 illustrates the previously discussed beneficial effects of prolonged reduction. Example 7 illustrates that a high temperature air activation followed by a short reduction at a lower temperature provides a catalyst virtually identical to that of Example 6 even though the lengths of the reduction periods differ by a factor of about 40. Examples 6 and 7 illustrate superior catalysts prepared by the preferred procedure of this invention, namely extensive reduction or activation of the alumina support to complete reduction by the removal of water.

TABLE III

THE EFFECT OF AIR ACTIVATION CONDITIONS ON PLATINUM-RHENIUM CATALYSTS
Heptane Reforming: 100 Psig, 932° F., 10 W/H/W, $H_2$/Oil = 5

| Example No. | 5 | 6 | 7 |
|---|---|---|---|
| Air Activation | | | |
| Temperature, °F. | 932 | 932 | 950 |
| Time, Hours | 3 | 4 | 4 |
| Reduction | | | |
| Temperature, °F. | 932 | 932 | 850 |
| Time, Hours | 1 | 19 | 0.5 |
| $H_2O$ in $H_2$, ppm (end of treat) | 1000 | 295 | 160 |
| Yield, Wt. % | | | |
| Methane | 1.4 | 1.3 | 1.2 |
| n-Butane | 6.7 | 5.7 | 5.7 |
| $C_5^+$ | 76.5 | 79.2 | 79.4 |
| Toluene | 26.3 | 30.4 | 29.5 |

EXAMPLES 8-13

Examples 8-10 in Table IV illustrate the effect of extensive reduction and air activation on a Pt-Re-Cu catalyst. Examples 9 and 10 using the procedure of this invention are superior to Example 8. Note that in Examples 9 and 10 the state of dehydration of the catalyst is nearly identical and considerably drier than that of Example 8. Note also that in Example 10 the higher temperature of air activation provides a drier catalyst for reduction and that the desiccant action of the alumina at the lower reduction temperature for 1 hr. provides the same degree of dehydration as does prolonged reduction (Example 9). Thus the same degree of reduction occurs providing catalysts of comparable behavior, both superior to the catalyst of Example 8.

Examples 11-13 in Table IV illustrate these same effects on a Pd-Pt-Re-Cu catalyst. As can be seen, a higher degree of dehydration achieved either by prolonged reduction or high temperature air activation followed by reduction at a lower temperature provides a superior catalyst.

TABLE IV

THE EFFECT OF PRETREAT CONDITIONS ON OTHER RHENIUM CONTAINING CATALYSTS
Heptane Reforming: 100 Psig, 932° F., 10 W/H/W, $H_2$/Heptane = 5

| Example No. | 8 | 9 | 10 | 11 | 12 | 13 |
|---|---|---|---|---|---|---|
| Catalyst | —0.3 Pt-0.3 Re-0.05 Cu— | | | —0.15 Pd-0.15 Pt-0.3 Re-0.05 Cu— | | |
| Air Activation | | | | | | |
| Temperature, °F. | 932 | 932 | 950 | 932 | 932 | 950 |
| Time, Hours | 3 | 3 | 3 | 3 | 3 | 3 |
| $H_2O$ in air, ppm (end of treat) | 300 | 390 | 100 | 300 | 300 | 100 |
| Reduction | | | | | | |
| Temperature, °F. | 932 | 932 | 932 | 932 | 932 | 932 |
| Time, Hours | 1 | 17 | 1 | 1 | 17 | 1 |
| $H_2O$ in $H_2$, ppm | >1000 | 400 | 300 | >1000 | 320 | 300 |
| Sulfiding Temp., °F. | 932 | 932 | 932 | 932 | 932 | 932 |
| Yield, Wt. % | | | | | | |
| $C_1$ | 1.0 | 0.9 | 0.9 | 0.6 | 0.5 | 0.5 |
| n-$C_4$ | 5.1 | 4.5 | 4.4 | 3.3 | 3.4 | 3.2 |
| $C_5^+$ | 79.9 | 81.7 | 82.4 | 82.6 | 83.6 | 83.9 |
| Toluene | 25.8 | 26.5 | 26.7 | 17.4 | 17.5 | 17.0 |

EXAMPLES 14–15

Additional data were obtained by reforming a low sulfur paraffinic naphtha over platinum-rhenium catalysts (0.3 wt. % Pt-0.3 wt. % Re), the paraffinic naphtha having the inspections given in Table V.

TABLE V

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No. RON Clear | 34.8 |
| Gravity, °API | 59.7 |
| Sulfur, Wt. ppm | <0.1 |
| Water, Wt. ppm | 7 |
| Chloride, Wt. ppm | <0.1 |
| Analysis, Vol. Percent | |
| Paraffins | 69.51 |
| Naphthenes | 18.48 |
| Aromatics | 12.01 |

The reforming runs were carried out at conditions required to produce a 100 RON liquid product, i.e., at 930° F., 200 psig, 5000 SCF/Bbl $H_2$ and 1.4 W/Hr/W.

The data, obtained on the same feedstock under identical process conditions, graphically depicted by reference to the FIGURE illustrates the profound beneficial effect of catalyst pretreatment on naphtha reforming. In the FIGURE there is shown a run for a catalyst, the catalyst of Example 1, reduced for 1 hour and sulfided at 932° F., and another which represents a reforming test with the catalyst of Example 2 reduced for 8 hours at 932° F. and sulfided at the same temperature. The former catalyst shows a much greater loss of activity and lower yields than the latter catalyst. These data show that reduction of the Pt/Re catalyst to the point of a low moisture content in the exit gas is clearly beneficial.

While the examples are specific to a Pt/Re catalyst, the criticality of the reduction conditions is common to any rhenium-containing reforming catalyst.

It is apparent that various modifications and changes can be made without departing from the spirit and scope of the present invention.

Having described the invention, what is claimed is:

1. In a process for the pretreatment and activation of a rhenium-containing reforming catalyst for use in the conversion of a naphtha feed by contact with said catalyst at reforming conditions, which steps include
   contacting said catalyst with an oxygen-containing gas at temperature sufficient to form rhenium oxide,
   contacting said rhenium oxide-containing catalyst with a stream of dry hydrogen gas, and
   sulfiding said rhenium-containing catalyst
   the improvement comprising
   maintaining contact between said dry hydrogen gas and said catalyst until the moisture level of the gas stream leaving said catalyst is less than about 1000 ppm and the rhenium oxide approaches a substantially zero valence state.

2. The process of claim 1 wherein said oxidation step is conducted by contacting said catalyst with a flowing stream of an oxygen-containing gas at temperatures ranging from about 850° F. to about 1100° F., and the reduction step is conducted at a temperature equal to or below the temperature of the oxidation step.

3. The process of claim 1 wherein said oxidation step is conducted by contacting said catalyst with a flowing stream of an oxygen-containing gas at temperatures ranging from about 850° F. to about 1100° F., and the reduction step is conducted at a temperature ranging from about 100 to about 250 Fahrenheit degrees below that at which the oxidation step is conducted.

4. The process of claim 3 wherein the temperature of the oxidation step ranges from about 950° F. to about 1150° F., and the reduction step is conducted at a temperature ranging from about 100 to about 150 Fahrenheit degrees below that at which the oxidation step is conducted.

5. The process of claim 1 wherein the time of the oxidation treatment ranges from about 2 hours to about 11 hours.

6. The process of claim 5 wherein the time of the oxidation treatment ranges from about 3 hours to about 4 hours.

7. The process of claim 1 wherein the flowing stream of gas is air.

8. The process of claim 1 wherein said oxidation step is conducted by contacting said catalyst with a flowing stream of an oxygen-containing gas at temperatures ranging from about 850° F. to about 1100° F., the time of the treatment ranges from about 2 hours to about 10 hours, and air is employed as the treating gas.

9. The process of claim 1 wherein said reducing step is conducted by contacting said catalyst with said stream of a hydrogen-containing gas at temperatures ranging from about 700° F. to about 950° F.

10. The process of claim 1 wherein said reducing step is conducted by contacting said catalyst with a flowing stream of a hydrogen-containing gas at temperatures ranging from about 100° F. to about 250° F. below the temperature at which the oxidation step is conducted, and the time of reduction ranges from about 0.5 hours to about 10 hours.

11. The process of claim 10 wherein time of reduction ranges from about 0.5 hours to about 2 hours.

12. The process of claim 1 wherein the sulfiding is conducted at breakthrough conditions.

13. The process of claim 1 wherein the catalyst is one comprised of platinum and rhenium.

14. The process of claim 1 wherein the catalyst is one comprised of platinum, rhenium, and copper.

15. The process of claim 1 wherein the catalyst is one comprised of platinum, rhenium, palladium, and copper.

* * * * *